(12) United States Patent  
Hayase et al.

(10) Patent No.: US 8,748,735 B2  
(45) Date of Patent: Jun. 10, 2014

(54) DYE-SENSITIZED SOLAR CELL AND PROCESS FOR MANUFACTURING THE SAME

(75) Inventors: Shuzi Hayase, Kitakyushu (JP); Ryuichi Shiratsuchi, Kitakyushu (JP); Suehiro Ohkubo, Kitakyushu (JP); Yoshihiro Yamaguchi, Kitakyushu (JP)

(73) Assignees: National University Corporation Kyushu Institute of Technology, Kitakyushu-shi (JP); Nippon Steel & Sumikin Chemical Co., Ltd., Tokyo (JP)

( * ) Notice: Subject to any disclaimer, the term of this patent is extended or adjusted under 35 U.S.C. 154(b) by 0 days.

(21) Appl. No.: 13/303,326

(22) Filed: Nov. 23, 2011

(65) Prior Publication Data

US 2012/0073643 A1  Mar. 29, 2012  
US 2014/0116503 A9  May 1, 2014

Related U.S. Application Data

(62) Division of application No. 12/304,038, filed as application No. PCT/JP2007/000667 on Jun. 21, 2007.

(51) Int. Cl.  
*H01L 31/18* (2006.01)

(52) U.S. Cl.  
USPC .... 136/256; 136/263; 136/252; 257/E31.126; 438/85; 438/98

(58) Field of Classification Search  
USPC ............... 136/256, 263, 252; 257/E31.126; 438/85, 98  
See application file for complete search history.

(56) References Cited

U.S. PATENT DOCUMENTS

| 2003/0230335 A1 | 12/2003 | Tsukahara | 136/252 |
| 2006/0289057 A1 | 12/2006 | Gonda et al. | 136/263 |
| 2007/0089783 A1* | 4/2007 | Jung et al. | 136/263 |
| 2007/0107775 A1* | 5/2007 | Choi et al. | 136/263 |
| 2009/0314339 A1* | 12/2009 | Hayase et al. | 136/256 |

FOREIGN PATENT DOCUMENTS

| JP | 2002-536805 | 10/2002 |
| JP | 2003-197283 | 7/2003 |
| JP | 2005-166313 | 6/2005 |
| JP | 2005-285473 | 10/2005 |
| JP | 2007-227260 | 9/2007 |
| WO | WO 00/48212 | 8/2000 |
| WO | WO 2005/053082 | 6/2005 |

OTHER PUBLICATIONS

International Search Report received on counterpart application No. PCT/JP2007/000667 dated Sep. 14, 2007.

* cited by examiner

*Primary Examiner* — Golam Mowla  
(74) *Attorney, Agent, or Firm* — Kratz, Quintos & Hanson, LLP (57) ABSTRACT

A dye-sensitized solar cell is provided, wherein it can be produced by a relatively easy and simple process and ensures high conversion efficiency even in cases where the thickness of the porous semiconductor layer is increased. The dye-sensitized solar cell 10 includes, in the interior of or on the conductive-substrate-side surface of the porous semiconductor layer 16, conductive metal film 20, such as a film of tungsten, having a large number of randomly located penetrations 24. Penetrations 24 of the conductive metal film 20 are formed by forming a fine-particle layer on the surface of the porous semiconductor layer, forming a conductive metal film on the surface of the fine-particle layer, and making the fine-particle layer disappear by heating or solvent-cleaning.

3 Claims, 4 Drawing Sheets

FIG. 4

DYE-SENSITIZED SOLAR CELL AND PROCESS FOR MANUFACTURING THE SAME

CROSS-REFERENCE TO RELATED APPLICATION

This Application is a Divisional Application of U.S. patent application Ser. No. 12/304,038 filed on Jan. 16, 2009. U.S. patent application Ser. No. 12/304,038 claimed priority under 35 USC §119 to Japan Application No 2006-178852, filed on Jun. 29, 2006.

TECHNICAL FIELD

The present invention relates to a dye-sensitized solar cell and a process for producing the same.

BACKGROUND ART

Dye-sensitized solar cells are known as wet solar cells or Grätzel cells, which are characterized by being produced without silicon semiconductor and having an electrochemical cell structure using an electrolysis solution represented by an iodine solution. Specifically, dye-sensitized solar cells have a simple structure which includes: a porous semiconductor layer, such as titania layer formed by baking titanium dioxide powder on a transparent conductive glass plate (a transparent substrate having a transparent conductive film laminated on its surface) and making the powder adsorb a dye; a counter electrode made up of a conductive glass plate (a conductive substrate); and an electrolysis solution, such as an iodine solution, arranged between the porous semiconductor layer and the counter electrode.

Dye-sensitized solar cells have attracted considerable attention as low-cost solar cells because their materials are not expensive and they do not require any large-scale facilities.

However, under present conditions, the sunlight conversion efficiency in dye-sensitized solar cells is about 11%; and thus, further improvement in conversion efficiency is needed.

Considerations have been made at various angles to improve sunlight conversion efficiency. One proposal given is to raise the sunlight absorption efficiency by increasing the thickness of the porous semiconductor layer.

There is another proposal for dye-sensitized solar cells, though the proposal is applicable only to dye-sensitized solar cells that include a metal oxide semiconductor layer of ordinary thickness. Specifically, in order to raise the conversion efficiency by efficiently transferring electrons to the transparent conductive film, a comb-shaped conductive layer is formed in the metal oxide semiconductor layer (porous semiconductor layer) about 10 to 13 μm thick and the conductive layer and the transparent conductive layer on the substrate are short-circuited. Such a conductive layer is formed, by vacuum deposition or the like, on the metal oxide semiconductor layer formed to about 8 μm thickness which has its end portion scribed so that the transparent conductive layer is exposed and which has a comb-shaped mask fixed on its surface (refer to Japanese Patent Laid-Open No. 2003-197283).

There is also proposed a photo-electric conversion device which has a wire-mesh-like structure made of metal arranged in its photosensitive layer (layer including semiconductor) (refer to Japanese Patent Laid-Open No. 2005-285473).

However, increasing the thickness of the porous semiconductor layer also presents some problems. If the electron diffusion length exceeds the thickness dimension of the porous semiconductor layer, increasing the thickness of the porous semiconductor layer does not have the effect of raising the conversion efficiency; to the contrary, open-circuit voltage is decreased and the conversion efficiency is lowered.

Further, the process disclosed in Japanese Patent Laid-Open No. 2003-197283, in which a comb-shaped conductive layer is formed in the metal oxide semiconductor layer by vacuum deposition, has the effect of improving the conversion efficient, but will be complicated and costly. Moreover, whether or not the process is suitably applicable to cases where the thickness of the porous semiconductor layer exceeds 13 μm has not yet been proven.

The process disclosed in Japanese Patent Laid-Open No. 2005-285473, in which a wire-mesh-like structure made of metal is arranged in the photosensitive layer (layer including semiconductor), is also complicated, like the process disclosed in Japanese Patent Laid-Open No. 2003-197283. Besides, there is a limit to decreasing the thickness of the wire-mesh-like structure, and thus, the process may present the problem of short-circuit due to the contact of the wire-mesh-like structure with the counter electrode.

The present invention has been made in the light of the above problems. Accordingly, the object of the present invention is to provide a dye-sensitized solar cell which can be produced by a relatively easy and simple process and ensures high conversion efficiency even in cases where the thickness of the porous semiconductor layer is increased and to provide a process for producing the same.

DISCLOSURE OF THE INVENTION

The dye-sensitized solar cell of the present invention is a dye-sensitized solar cell, including a transparent substrate, a transparent conductive film formed on the surface of the transparent substrate, a conductive substrate provided opposite to the transparent conductive film, and a dye-adsorbed porous semiconductor layer and an electrolyte between the transparent conductive film and the conductive substrate, characterized in that there is formed, in the interior of or on the conductive-substrate-side surface of the porous semiconductor layer, a conductive metal film which has a large number of randomly located penetrations and is electrically connected to the transparent conductive film.

The dye-sensitized solar cell of the present invention is characterized in that the material for the conductive metal film is corrosion-resistant metal.

The dye-sensitized solar cell of the present invention is characterized in that the corrosion-resistant metal is one kind or two or more kinds of metal selected from tungsten, titanium and nickel, or the compound(s) thereof.

The dye-sensitized solar cell of the present invention is characterized in that the thickness of the porous semiconductor layer is 14 μm or more.

The process for producing a dye-sensitized solar cell of the present invention is a process for producing a dye-sensitized solar cell that includes a transparent substrate, a transparent conductive film formed on the surface of the transparent substrate, a conductive substrate provided opposite to the transparent conductive film, and a dye-adsorbed porous semiconductor layer and an electrolyte between the transparent conductive film and the conductive substrate, characterized in that it includes: a first step in which the porous semiconductor layer is formed on the transparent conductive film; a second step in which a fine-particle layer made up of fine particles removable by heating or solvent-cleaning is formed on the surface of the porous semiconductor layer; a third step in which a conductive metal film is formed on the surface of the fine-particle layer; and a fourth step in which the fine-particle layer is made to disappear by heating or solvent-cleaning.

Further, the process for producing a dye-sensitized solar cell of the present invention is a process for producing a dye-sensitized solar cell that includes a transparent substrate, a transparent conductive film formed on the surface of the transparent substrate, a conductive substrate provided opposite to the transparent conductive film, and a dye-adsorbed porous semiconductor layer and an electrolyte between the transparent conductive film and the conductive substrate, characterized in that it includes: a first step in which the porous semiconductor layer is formed on the transparent conductive film; a second step in which a mixed layer of a porous semiconductor material and fine particles removable by heating or solvent-cleaning is formed on the surface of the porous semiconductor layer; a third step in which a conductive metal film is formed on the surface of the mixed layer; and a fourth step in which the fine particles are made to disappear by heating or solvent-cleaning.

Further, the process for producing a dye-sensitized solar cell of the present invention is a process for producing a dye-sensitized solar cell that includes a transparent substrate, a transparent conductive film formed on the surface of the transparent substrate, a conductive substrate provided opposite to the transparent conductive film, and a dye-adsorbed porous semiconductor layer and an electrolyte between the transparent conductive film and the conductive substrate, characterized in that it includes: a first step in which the porous semiconductor layer is formed on the surface of the transparent conductive film; a second step in which a mixed layer of a conductive metal and fine particles removable by heating or solvent-cleaning is formed on the surface of the porous semiconductor layer; and a third step in which the fine particles are made to disappear by heating or solvent-cleaning.

Further, the process for producing a dye-sensitized solar cell of the present invention is characterized in that it further includes a fifth step in which a porous semiconductor layer, different from the porous semiconductor layer formed in the first step, is formed on the surface of the conductive metal film.

Further, the process for producing a dye-sensitized solar cell of the present invention is characterized in that the particle size of resin fine particles removable by heating or solvent-cleaning and used in the second step is 50 to 400 nm and the thickness of the conductive metal film formed in the third step is 50 to 400 nm.

In the dye-sensitized solar cell of the present invention, a conductive metal film having a large number of randomly located penetrations is formed in the interior of or on the conductive-substrate-side surface of its porous semiconductor layer, whereby it can be produced easily; and moreover, even in the case where the thickness of the porous semiconductor layer is increased, a high conversion efficiency can be obtained.

The process for producing a dye-sensitized solar cell of the present invention includes: a first step in which the porous semiconductor layer is formed on the transparent conductive film; a second step in which a fine-particle layer made up of fine particles removable by heating or solvent-cleaning is formed on the surface of the porous semiconductor layer; a third step in which a conductive metal film is formed on the surface of the fine-particle layer; and a fourth step in which the fine-particle layer is made to disappear by heating or solvent-cleaning. Alternatively, the process includes: a first step in which the porous semiconductor layer is formed on the transparent conductive film; a second step in which a mixed layer of a porous semiconductor material and fine particles removable by heating or solvent-cleaning is formed on the surface of the porous semiconductor layer; a third step in which a conductive metal film is formed on the surface of the mixed layer; and a fourth step in which the fine particles are made to disappear by heating or solvent-cleaning, or the process includes: a step of forming the porous semiconductor layer on the surface of the transparent conductive film; a step of forming, on the surface of the porous semiconductor layer, a mixed layer of a conductive metal and fine particles removable by heating or solvent-cleaning; and a step of making the fine particles disappear by heating or solvent-cleaning, and further includes a fifth step in which a porous semiconductor layer, different from the porous semiconductor layer formed in the first step, is formed on the surface of the conductive metal film, whereby the conductive metal film having a large number of randomly located penetrations can be formed reliably in an easy manner.

| Description of Symbols | |
|---|---|
| 10 | Dye-sensitized solar cell |
| 12a | Transparent substrate |
| 12b | Substrate |
| 14a | Transparent conductive film |
| 14b | Conductive film |
| 16 | Porous semiconductor layer |
| 18 | Electrolyte |
| 20 | Conductive metal film |
| 22 | Separator |
| 24 | Penetration |

BEST MODE FOR CARRYING OUT THE INVENTION

Preferred embodiments of dye-sensitized solar cell and process for producing the same according to the present invention will be described below with reference to the accompanying drawings.

Figure 1:
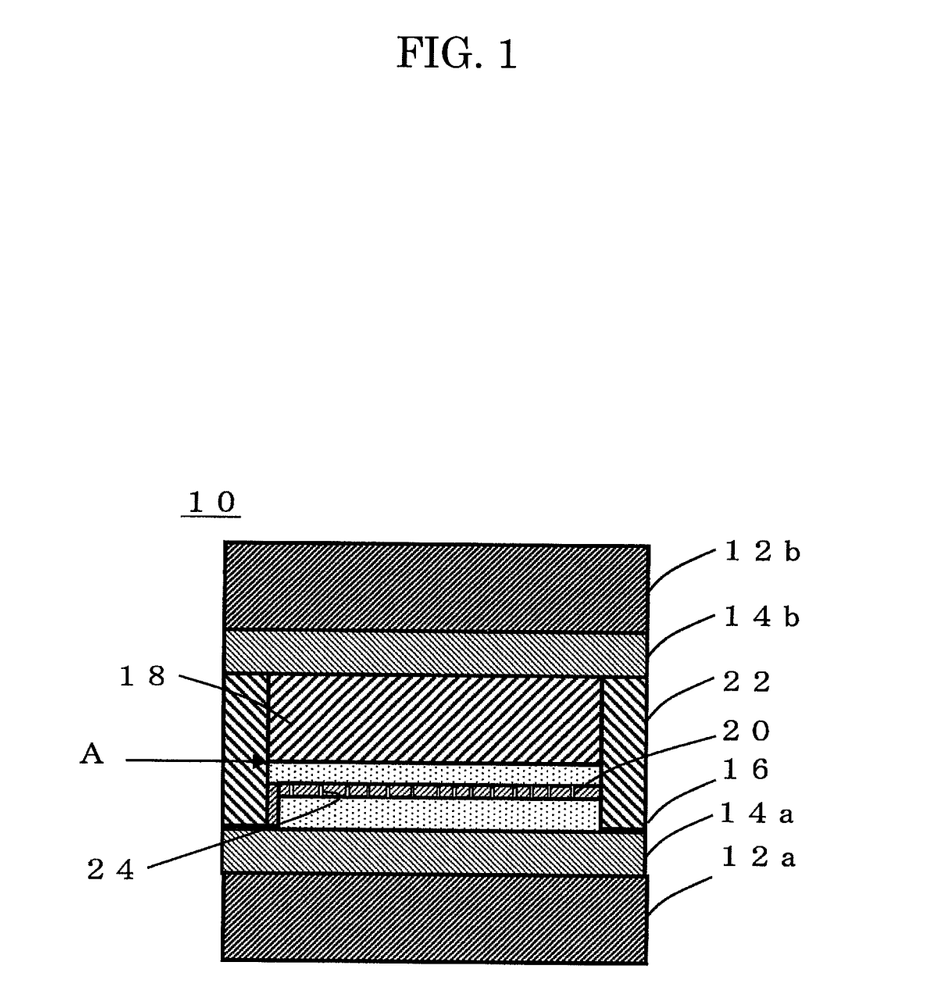
FIG. 1 is a schematic view of a dye-sensitized solar cell of the present invention.

For example, as schematically shown in FIG. 1, dye-sensitized solar cell 10 according to one embodiment of the present invention includes: transparent substrate 12a; transparent conductive film 14a formed on the surface of the transparent substrate 12a; a conductive substrate (in FIG. 1, the conductive substrate is composed of the conductive film 14b and the substrate 12b) provided opposite to the transparent conductive film 14a; and dye (not shown in FIG. 1)—adsorbed porous semiconductor layer 16 and electrolyte 18 between the transparent conductive film 14a and the conductive substrate.

In FIG. 1, conductive metal film 20 is formed in the interior of the porous semiconductor layer 16. The dye-sensitized solar cell of the present invention is, however, not limited to this mode, and the conductive metal film 20 may be formed on the surface of the porous semiconductor layer 16 on the conductive substrate side (in FIG. 1, the position shown by arrow A) or a plurality of conductive metal films 20 and porous semiconductor layers may be alternately formed.

One end (one side) of the conductive metal film 20 is connected to the transparent conductive film 14a, as shown in FIG. 1. However, the conductive metal film 20 may be electrically connected to the transparent conductive film 14a in any other appropriate manner than this. For example, both ends (two sides) of the conductive metal film 20 may be connected to the transparent conductive film 14a, or the conductive metal film 20 may be connected to the transparent conductive film 14a via an upright conductive column which extends from the middle of the transparent conductive film 14a to the middle of the conductive metal film 20. In the conductive metal film 20 penetrations 24 were formed. The details of the penetrations 24 will be described later.

In FIG. 1, reference numeral 22 denotes a separator, which is provided to seal the electrolyte 18 in the cell.

The transparent substrate 12a and the substrate 12b may be, for example, a glass plate or plastic plate.

The transparent conductive film 14a and the conductive film 14b may be, for example, an ITO (tin-doped indium film) or FTO (fluorine-doped tin oxide film) or $SnO_2$ film.

The dye adsorbed by the porous semiconductor layer 16 is one with absorption at a wavelength of 400 nm to 1000 nm. Examples of such dyes include: metal complexes such as ruthenium dyes and phthalocyanine dyes; and organic dyes such as cyanine dyes.

Electrolyte (electrolysis solution) 18 contains iodine, lithium ion, ionic liquid, and t-butylpyridine. For iodine, an oxidation-reduction agent including the combination of iodide ion and iodine can be used. An oxidation-reduction agent includes an appropriate solvent in which the agent is soluble.

For the porous semiconductor layer 16, an oxide of a metal such as titanium, tin, zirconium, zinc, indium, tungsten, iron, nickel or silver can be used as a semiconductor material. Of these oxides, titanium oxide (titania) is preferable.

Fine particles of titanium oxide include: relatively smaller particles whose particle size is 10 nm or less; and relatively larger particles whose particle size is about 20 to 30 nm. When using the former ones, relatively close films are formed, whereas when using the latter ones, porous films are formed. The surface of the transparent conductive film, such as a tin oxide film, is uneven, and to cover such an uneven surface with high surface coverage, it is desirable to use a relatively close porous semiconductor layer 16. Thus, an embodiment of the present invention is preferable where porous semiconductor layer 16 is two-layered, the first layer, which is on the transparent conductive film side, being formed using titanium oxide fine particles of relatively small particle size, and the second layer, which is formed on the surface of the first layer, being formed using titanium oxide fine particles whose particle size is larger than that of the first layer.

The conductive metal film 20 can be formed using any appropriate metal as long as the metal has proper degree of conductivity. "Metal" herein used means not only simple metal, but metal compounds such as metal oxides and alloys. The conductive metal film 20 may be a conductive metal film having a surface that is coated with a close oxide semiconductor, such as titania.

However, from the viewpoint of reliably protecting conductive metal film 20 from corrosion caused by electrolyte 18 that contains an oxidation-reduction agent such as iodine, it is preferable to use a corrosion-resistant metal.

Tungsten (W), titanium (Ti), nickel (Ni), a mixture thereof, or a metal compound thereof can be suitably used as a corrosion-resistant metal. Besides, a metal with its surface passivated can also be used.

The conductive metal film 20 can be formed on the surface of porous semiconductor layer 16 by a simple method such as coating method. When forming the conductive metal film 20, one end, for example, of the porous semiconductor layer 16 is cut in advance by an appropriate method to form a connection where the conductive metal film 20 is connected to the transparent conductive film 14a. If the conductive metal film 20 is formed so that it has a proper degree of thickness, the penetrations 24 are formed in the portion of the conductive metal film 20 where thickness is relatively small. "A proper degree of thickness" may be about 50 to 400 nm, though it varies depending on the conditions of the porous semiconductor layer 16 etc. The penetrations 24 are randomly located; and countless penetrations are formed depending on the conditions. However, a moderate number of the penetrations are enough as long as the electrolyte 18 can appropriately penetrate and pass through them.

A plurality of conductive metal films 20 can be formed so that each porous semiconductor layer is sandwiched between the films. In other words, a plurality of conductive metal films 20 and porous semiconductor layers may be alternately formed.

Described in the following is a process for producing a dye-sensitized solar cell according to one embodiment of the present invention.

A process for producing a dye-sensitized solar cell according to one embodiment of the present invention is a process for producing a dye-sensitized solar cell that includes: a transparent substrate; a transparent conductive film formed on the surface of the transparent substrate; a conductive substrate provided opposite to the transparent conductive film; and a dye-adsorbed porous semiconductor layer and an electrolyte between the transparent conductive film and the conductive substrate, including: a step of forming a porous semiconductor layer on the surface of a transparent conductive film (first step); a step of forming, on the surface of the porous semiconductor layer, a fine-particle layer composed of fine particles removable by heating or solvent-cleaning (second step); a step of forming a conductive metal film on the surface of the fine-particle layer (third step); and a step of making the fine-particle layer disappear by heating or solvent-cleaning (fourth step). By this process, a dye-sensitized solar cell including a conductive metal film in which a large number of penetrations are randomly located can be obtained.

When removing the fine-particle layer by heating, a fine-particle material which pyrolytically decomposes and disappears at temperatures which causes no thermal damage to the layers, such as the porous semiconductor layer, formed in advance is used and burning is carried out at temperatures around the pyrolytical-decomposition temperature of the material. When removing the fine-particle layer by solvent-cleaning, a solvent which causes no chemical damage to the layers, such as the porous semiconductor layer, formed in advance and a fine-particle material which can be easily removed by cleaning using the solvent is used in combination.

Examples of fine-particle materials suitably used include: but not limited to, resins such as polystyrene and poly(methyl methacrylate); and metal oxides such as zinc oxide. The solvent used for the solvent-cleaning is not limited to any specific one and is appropriately selected depending on the fine-particle material used. Examples of solvents used include: organic solvents, such as toluene, which can dissolve resins; and acids, such as dilute hydrochloric acid, which can dissolve metals.

With the process for producing a dye-sensitized solar cell according to this embodiment, a relatively stable conductive metal film can be easily formed on the surface of the fine-particle layer by a proper method such as a deposition or coating method. Besides, a large number of penetrations randomly located in the conductive metal film can be easily formed in the course of removing the fine-particle layer by heating.

The process for producing a dye-sensitized solar cell according to this embodiment may be such that it includes: a step of forming a porous semiconductor layer on the surface of a transparent conductive film (first step); a step of forming, on the surface of the porous semiconductor layer, a mixed layer of a porous semiconductor material and fine particles removable by heating or solvent-cleaning (second step); a step of forming a conductive metal film on the mixed layer (third step); and a step of making the fine particles disappear by heating or solvent-cleaning (fourth step). With the process for producing a dye-sensitized solar cell according to this embodiment, a conductive metal film in which a large number of penetrations are randomly located is obtained, and, after the fine particles are dissolved, the porous semiconductor material in which fine particles have been mixed becomes a support which supports the conductive metal, whereby the conductive metal film is supported more firmly.

The process for producing a dye-sensitized solar cell according to this embodiment may also be such that it includes: a step of forming a porous semiconductor layer on the surface of a transparent conductive film (first step); a step of forming, on the surface of the porous semiconductor layer, a mixed layer of a conductive metal and fine particles removable by heating or solvent-cleaning (second step); and a step of making the fine particles disappear by heating or solvent-cleaning (third step). By this process, a conductive metal film in which a large number of penetrations are randomly located can be formed on the surface of the porous semiconductor film. According to this production process, a mixed layer of conductive metal and fine particles is formed in a single step, whereby the production process is simplified.

The process for producing a dye-sensitized solar cell according to this embodiment may also be such that it further includes a fifth step of forming a porous semiconductor layer, different from the porous semiconductor layer formed in the first step, on the surface of the conductive metal film.

If the particle size (diameter) of the fine particles removable by heating or solvent-cleaning and used in the second step is 50 to 400 nm, and if the thickness of the conductive metal film formed in the third step is 50 to 400 nm, a large number of penetrations can be formed more reliably.

Similarly, the process for producing a dye-sensitized solar cell of the present invention can also be used for a process for producing a dye-sensitized solar cell that includes a conductive metal film in which no penetrations are formed. The process may be such that it includes a step of forming another porous semiconductor layer on the surface of the conductive metal film or it allows the conductive metal film to come in contact direct with the electrolyte.

In the dye-sensitized solar cell 10 of the present invention described so far, electrons easily move in porous semiconductor layer 16 via conductive metal film 20 which functions as a current-collecting layer; and the resistance to the charge transfer from the conductive metal film 20 to the electrolyte 18 is large and reverse electron transfer is hard to occur. Thus, even in cases where the thickness of porous semiconductor layer 16 is increased to, for example, 14 µm or more, high conversion efficiency can be obtained. The upper limit of the thickness of porous semiconductor layer 16 is, for example, about 40 µm, although it is appropriately established depending on the obtained value of conversion efficiency. It goes without saying that the process of the present invention is suitably applicable to cases where porous semiconductor layer 16 has an ordinary thickness.

EXAMPLES

The present invention will be further described by Examples and Comparative examples. It is to be understood that Examples below are not intended to limit the present invention.

Examples 1 to 4

Borosilicate glass with a transparent conductive film 20 mm×30 mm in dimensions and 1 mm in thickness was coated with titanium oxide nanoparticle paste (particle size: 20 nm) and burned at 500° C. to prepare a titanium oxide porous film (porous semiconductor layer) with thickness 15 µm.

On the titanium oxide porous film was formed a tungsten (W) film (conductive metal film) having a thickness t in the range of 50 to 150 nm and penetrations with an average pore size of about 3 µm. On the tungsten (W) film was formed a titanium oxide porous film, one as described above, with thickness 15 µm. Then, the film was immersed into an aqueous solution of titanium tetrachloride and heated at 500° C. N3 dye (manufactured by Solaronix) was used.

This film, together with an FTO film having a platinum film formed on its surface by sputtering, as a counter electrode, was sealed with a 50-µm spacer. An electrolyte prepared by dissolving 250 ml of $I_2$ and 580 mM of t-BuPy in acetonitrile was injected into the resultant cell in order to produce a battery (battery cell).

The characteristics of each of the solar cells were measured using a solar simulator while exposing each of the dye-sensitized solar cells to simulated sunlight. The conversion efficiency (ratio of conversion efficiency) of each of the solar cells was compared with that of a film which had similar construction, but did not include a transparent intermediate current-collecting layer.

Comparative Example 1

A cell (battery cell) having conventional construction was produced in the same manner as in Examples 1 to 3 except that a tungsten film was not formed, and the obtained cell was evaluated in the same manner as in Examples 1 to 3.

Examples 4, 5

Borosilicate glass with a transparent conductive film 20 mm×10 mm in dimensions and 1 mm in thickness was coated with titanium oxide nanoparticle paste (particle size: 20 nm) and burned at 500° C. to prepare a titanium oxide porous film with thickness 30 µm.

On the titanium oxide porous film was formed a tungsten film having a thickness t in the range of 40 to 120 nm and penetrations with an average pore size of about 3 µm. Then, the film was immersed into an aqueous solution of titanium tetrachloride and heated at 500° C. N719 dye was used.

This film, together with an FTO film having a platinum film formed on its surface by sputtering, as a counter electrode, was sealed with a 50-μm spacer. An electrolyte prepared by dissolving 250 ml of $I_2$ and 580 mM of t-BuPy in acetonitrile was injected into the resultant cell in order to produce a cell. The obtained cell was evaluated in the same manner as in Examples 1 to 3.

Comparative Example 2

A cell having conventional construction was produced in the same manner as in Examples 4 and 5 except that a tungsten film was not formed, and the obtained cell was evaluated in the same manner as in Examples 1 to 3.

Example 6

Borosilicate glass with a transparent conductive film 20 mm×10 mm in dimensions and 1 mm in thickness was coated with titanium oxide nanoparticle paste (particle size: 20 nm) and burned at 500° C. to prepare a titanium oxide porous film with thickness 30 μm.

On the titanium oxide porous film was formed a tungsten film having a thickness t of 120 nm and penetrations with an average pore size of about 3 μm. Then, the film was immersed into an aqueous solution of titanium tetrachloride and heated at 500° C. N719 dye was used.

This film, together with an FTO film having a platinum film formed on its surface by sputtering, as a counter electrode, was sealed with a 50-μm spacer. An electrolyte prepared by dissolving 250 ml of $I_2$ and 580 mM of t-BuPy in acetonitrile was injected into the resultant cell in order to produce a cell. The obtained cell was evaluated in the same manner as in Examples 1 to 3.

Example 7

Borosilicate glass with a transparent conductive film 20 mm×10 mm in dimensions and 1 mm in thickness was coated with titanium oxide nanoparticle paste (particle size: 20 nm) and burned at 500° C. to prepare a titanium oxide porous film with thickness 30 μm.

On the titanium oxide porous film was formed a titanium film having a thickness t of 120 nm and penetrations with an average pore size of about 3 μm. Then, the film was immersed into an aqueous solution of titanium tetrachloride and heated at 500° C. Half of the titania layer was dyed with N719 dye and the other half with black dye so as to give two layers of different colors.

This film, together with an FTO film having a platinum film formed on its surface by sputtering, as a counter electrode, was sealed with a 50-μm spacer. An electrolyte prepared by dissolving 250 ml of $I_2$ and 580 mM of t-BuPy in acetonitrile was injected into the resultant cell in order to produce a battery cell. The obtained cell was evaluated in the same manner as in Examples 1 to 3.

Comparative Example 3

A cell (battery cell) having conventional construction was produced in the same manner as in Examples 8 except that a tungsten film was not formed and N719 dye alone was used, and the obtained cell was evaluated in the same manner as in Examples 1 to 3.

Examples 8 to 16

Cells were produced in the same manner as in Example 7 varying the conditions: the location of the conductive metal film formed in the porous semiconductor layer (distance from the surface); the thickness of the conductive metal film; the metal species of the conductive metal film (kinds); the construction of the titanium oxide porous film (porous semiconductor layer); the kinds of dyes and electrolyte (electrolysis solution), as shown in Table 2. The obtained cells were evaluated in the same manner as in Examples 1 to 3.

H paste in Table 2 means a layer formed of paste of titanium oxide nanoparticles having a particle size of about 20 nm, whereas D paste in Table 2 means a layer formed of paste of titanium oxide nanoparticles having a particle size of about 23 nm.

In Examples 11 to 16, the conductive metal film was arranged in the interior of the porous semiconductor layer by coating the surface of H paste with part of D paste, then with a conductive metal film, and with the rest of D paste.

Examples 17 to 19

Cells (battery cells) were produced in the same manner as in Example 8 to Example 16 except that polystyrene particles having a particle size of 300 nm were scattered on the surface of D paste, and a conductive metal film was formed in the spaces among the polystyrene particles by plasma arc using the D paste having polystyrene particles scattered on its surface as a mold, followed by burning at 450° C. The obtained cells were evaluated in the same manner as in Example 1 to Example 3. The film forming conditions and the results are shown in Table 3. Instead of scattering polystyrene particles on the D paste surface, a single-layer film of polystyrene may be formed. The polystyrene-particle layer formed by scattering polystyrene particles or the polystyrene single-layer film is removed in the process of burning afterwards, and penetrations are formed in the conductive metal film. Instead of plasma arc method, coating method can be used as a method of forming the conductive metal film.

Example 20

Titania paste (one layer of HT paste, 5 layers of D paste, manufactured by SOLARONIX) was coated on a transparent conductive film substrate (lowE glass, manufactured by Nippon Sheet Glass Company, Ltd.) and burned at 500° C. for 30 minutes. On the titania surface of the burned substrate polystyrene micro-spheres (400 nm in diameter) were scattered. Then a W film (200 nm) was formed by sputtering. The remaining polystyrene micro-spheres were removed by rinsing with a solvent (toluene). Thus, a porous tungsten (W) film (conductive metal film) was prepared. The substrate was then immersed in a 0.05 wt % die solution (Blackdye, manufactured by SOLARONIX, acetonitrile:t-butyl alcohol=1:1) (20 hours). A transparent conductive film having undergone platinum sputtering (the same as above) was used as a counter electrode. The titania substrate, together with the counter electrode, was sealed with a spacer 50 μm thick (HIMILAN, manufactured by DU PONT-MITSUI POLYCHEMICALS CO., LTD.). A solution of 40 mM iodine, 500 mM LiI and 580 mM t-Butylpyridine in acetonitrile was used as an electrolysis solution. The evaluation of the solar cell characteristics showed that the conversion efficiency was 10.5%.

Comparative Example 5

A cell was produced in the same manner as in Example 1 except that polystyrene was not used. Current flow was observed right after the exposure to light, but after that, the electrolysis solution was not able to pass through the close W electrode, and the current flow was decreased. The evaluation of the solar cell characteristics showed that the conversion efficiency was 2%.

Comparative Example 6

A cell was produced in the same manner as in Example 1 except that neither polystyrene nor W film was used. The evaluation of the solar cell characteristics showed that the conversion efficiency was 9.5%.

Example 21

Titania paste (one layer of HT paste, 5 layers of D paste, manufactured by SOLARONIX) was coated on a transparent conductive film substrate (lowE glass, manufactured by Nippon Sheet Glass Company, Ltd.) and burned at 500° C. for 30 minutes. On the titania surface of the burned substrate polystyrene micro-spheres (300 nm) were scattered. Then a Ti film (200 nm) was formed by sputtering. The remaining polystyrene micro-spheres were removed by heating at 350° C. Thus, a porous Ti was prepared. The substrate was then immersed in a 0.05 wt % die solution (Blackdye, manufactured by SOLARONIX, acetonitrile:t-butyl alcohol=1:1) (20 hours). A transparent conductive film having undergone platinum sputtering (the same as above) was used as a counter electrode. The titania substrate, together with the counter electrode, was sealed with a spacer 5.0 μm thick (HIMILAN, manufactured by DU PONT-MITSUI POLYCHEMICALS CO., LTD.). A solution of 40 mM iodine, 500 mM LiI and 580 mM t-Butylpyridine in acetonitrile was used as an electrolysis solution. The evaluation of the solar cell characteristics showed that the conversion efficiency was 10.3%.

Example 22

Titania paste (one layer of HT paste, 5 layers of D paste, manufactured by SOLARONIX) was coated on a transparent conductive film substrate (lowE glass, manufactured by Nippon Sheet Glass Company, Ltd.) and burned at 500° C. for 30 minutes. Zinc oxide micro-spheres (300 nm) were scattered on the titania surface of the burned substrate. Then, a W film (200 nm) was formed by sputtering. The remaining zinc oxide micro-spheres were removed by rinsing with dilute hydrochloric acid. Thus a porous W was prepared. The substrate was then immersed in a 0.05 wt % die solution (Blackdye, manufactured by SOLARONIX, acetonitrile:t-butyl alcohol=1:1) (20 hours). A transparent conductive film having undergone platinum sputtering (the same as above) was used as a counter electrode. The titania substrate, together with the counter electrode, was sealed with a spacer 50 μm thick (HIMILAN, manufactured by DU PONT-MITSUI POLYCHEMICALS CO., LTD.). A solution of 40 mM iodine, 500 mM LiI and 580 mM t-Butylpyridine in acetonitrile was used as an electrolysis solution. The evaluation of the solar cell characteristics showed that the conversion efficiency was 10.5%.

The results so far are summarized in Table 1 to Table 4. The solar cells of Example 3 and Example 6 where the thickness of the transparent conductive films were 150 nm and 120 nm, respectively, showed conversion efficiency lower than that of Comparative examples 1 and 2. However, it is meaningful to make the thickness of the transparent conductive film 120 nm or more depending on the conditions such as the thickness of the porous semiconductor layer.

TABLE 1

| | Location of conductive metal film formed in porous semiconductor layer (Comparative examples not included) | Thickness t of conductive metal film (nm) | Ratio of conversion efficiency | Kinds of dyes |
|---|---|---|---|---|
| Example 1 | In the interior | 50 | 8.5 | N3 |
| Example 2 | (the location | 100 | 8.9 | |
| Example 3 | 15 μm distant | 150 | 2.8 | |
| Comparative example 1 | from the surface) | — | 6.2 | |
| Example 4 | On the surface | 40 | 9.0 | N719 |
| Example 5 | | 80 | 9.2 | |
| Comparative example 2 | | — | 7.2 | |
| Example 6 | | 120 | 9.2 | |
| Example 7 | | 120 | 9.9 | N719/Black dye |
| Comparative example 3 | | — | 7.8 | N719 |

TABLE 2

| | Location of conductive metal film formed in porous semiconductor layer (distance from the surface) (μm) | Thickness t of conductive metal film (nm) | Metal species of conductive metal film | Construction of porous semiconductor layer 2 layers (transparent conductive film side/conductive metal film side) | Thickness of porous semiconductor layer (μm) (transparent conductive film side/conductive metal film side) | Kinds of dyes | Kind of electrolysis solution | Ratio of conversion efficiency |
|---|---|---|---|---|---|---|---|---|
| Example 8 | 0 | 70 | Ti | Hpaste/Dpaste | 5/20 | N3/Blackdye | Electrolysis solution 1 | 8.5 |
| Example 9 | 0 | 50 | Ni | | 3/25 | N3/Blackdye | Electrolysis solution 1 | 8.2 |
| Example 10 | 0 | 70 | W | | 5/20 | N719/Blackdye | Electrolysis solution 1 | 10.3 |
| Example 11 | 5 | 60 | Ti | | 5/20 | N3/Blackdye | Electrolysis solution 1 | 8 |
| Example 12 | 7 | 50 | Ni | | 3/25 | N3/Blackdye | Electrolysis solution 1 | 9 |
| Example 13 | 7 | 40 | W | | 5/20 | N719/Blackdye | Electrolysis solution 1 | 10 |
| Example 14 | 5 | 60 | Ti | | 5/20 | N3/Blackdye | Electrolysis solution 2 | 5 |
| Example 15 | 7 | 50 | Ni | | 3/25 | N3/Blackdye | Electrolysis solution 2 | 4 |

TABLE 2-continued

| | Location of conductive metal film formed in porous semiconductor layer (distance from the surface) (μm) | Thickness t of conductive metal film (nm) | Metal species of conductive metal film | Construction of porous semiconductor layer 2 layers (transparent conductive film side/conductive metal film side) | Thickness of porous semiconductor layer (μm) (transparent conductive film side/conductive metal film side) | Kinds of dyes | Kind of electrolysis solution | Ratio of conversion efficiency |
|---|---|---|---|---|---|---|---|---|
| Example 16 | 7 | 40 | W | | 5/20 | N719/Blackdye | Electrolysis solution 2 | 7 |

Electrolysis solution 1: Acetonitrile solution, LiI 100 mM, t-butylpyridine 580 mM, Methylpropyl imidazorium iodide 500 mM, iodine 50 mM
Electrolysis solution 2: Mehylpropyimidazolium iodide solution, LiI 100 mM, t-butylpyridine 580 mM, iodine 300 mM

TABLE 3

| | Location of conductive metal film formed in porous semiconductor layer (distance from the surface) (μm) | Thickness t of conductive metal film (nm) | Metal species of conductive metal film | Construction of porous semiconductor layer 2 layers (transparent conductive film side/conductive metal film side) | Thickness of porous semiconductor layer (μm) (transparent conductive film side/conductive metal film side) | Kinds of dyes | Kind of electrolysis solution | Ratio of conversion efficiency |
|---|---|---|---|---|---|---|---|---|
| Example 17 | 0 | 200 | Ti | Hpaste/Dpaste | 5/20 | N3/Blackdye | Electrolysis solution 1 | 9 |
| Example 18 | 0 | 300 | Ni | | 3/25 | N3/Blackdye | Electrolysis solution 1 | 10 |
| Example 19 | 0 | 300 | W | | 5/20 | N719/Blackdye | Electrolysis solution 1 | 11 |

Electrolysis solution 1: Acetonitrile solution, LiI 100 mM, t-butylpyridine 580 mM, Methylpropyl imidazorium iodide 500 mM, iodine 50 mM

TABLE 4

| | Location of conductive metal film formed in porous semiconductor layer (distance from the surface) (μm) | Thickness t of conductive metal film (nm) | Metal species of conductive metal film | Construction of porous semiconductor layer single layer (formed on the transparent conductive film side alone) | Thickness of porous semiconductor layer (μm) | Kind of fine particles The values in parentheses indicate diameter (nm). | Method of removing fine particles | Kind of dye | Ratio of conversion efficiency |
|---|---|---|---|---|---|---|---|---|---|
| Example 20 | 30 | 200 | W | Hpaste/Dpaste | 30 | Polystyrene (200) | Cleaning with toluene | Blackdye | 10.5 |
| Comparative example 5 | 30 | 200 | W | | 30 | — | — | Blackdye | 2 |
| Comparative example 6 | — | 200 | — | | 30 | — | — | Blackdye | 9.5 |
| Example 21 | 30 | 200 | Ti | | 30 | Polystyrene (200) | Heating at 500° C. | Blackdye | 10.3 |
| Example 22 | 30 | 200 | W | | 30 | zinc oxide (300) | Cleaning with dilute hydrochloric acid | Blackdye | 10.5 |

Figure 3:
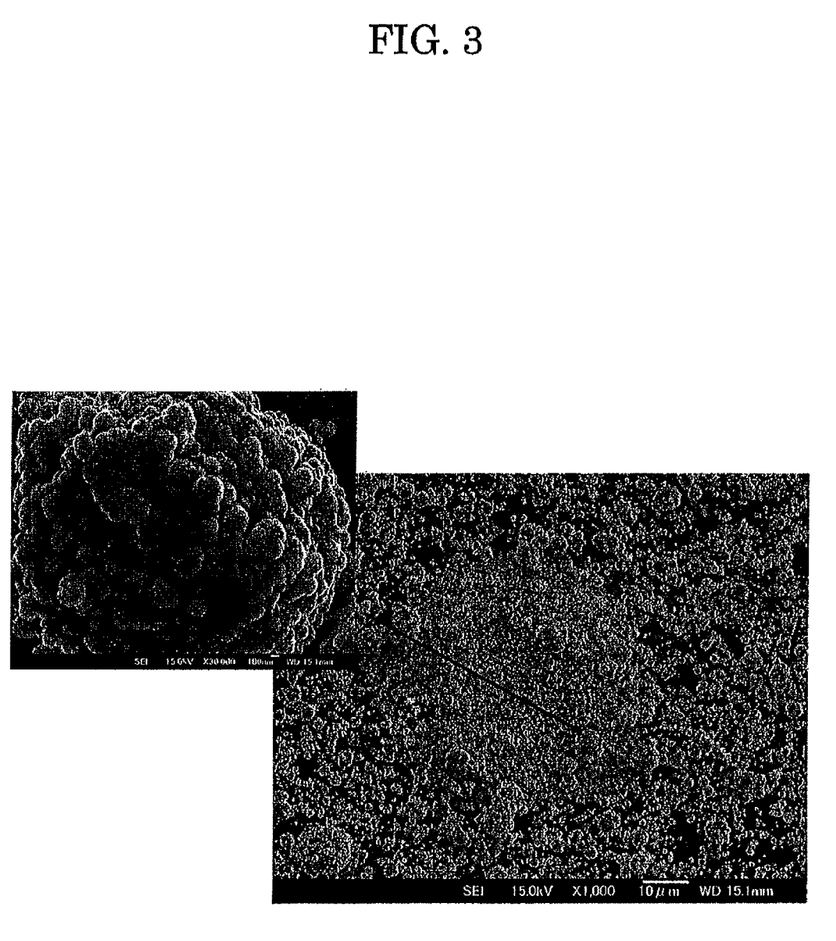
FIG. 3 is an EF-SEM image of the tungsten layer which is formed on the titania layer of the dye-sensitized solar cell of Example 22 by scattering zinc oxide micro-spheres on the titania layer and sputtering tungsten on the same layer.
Figure 4:
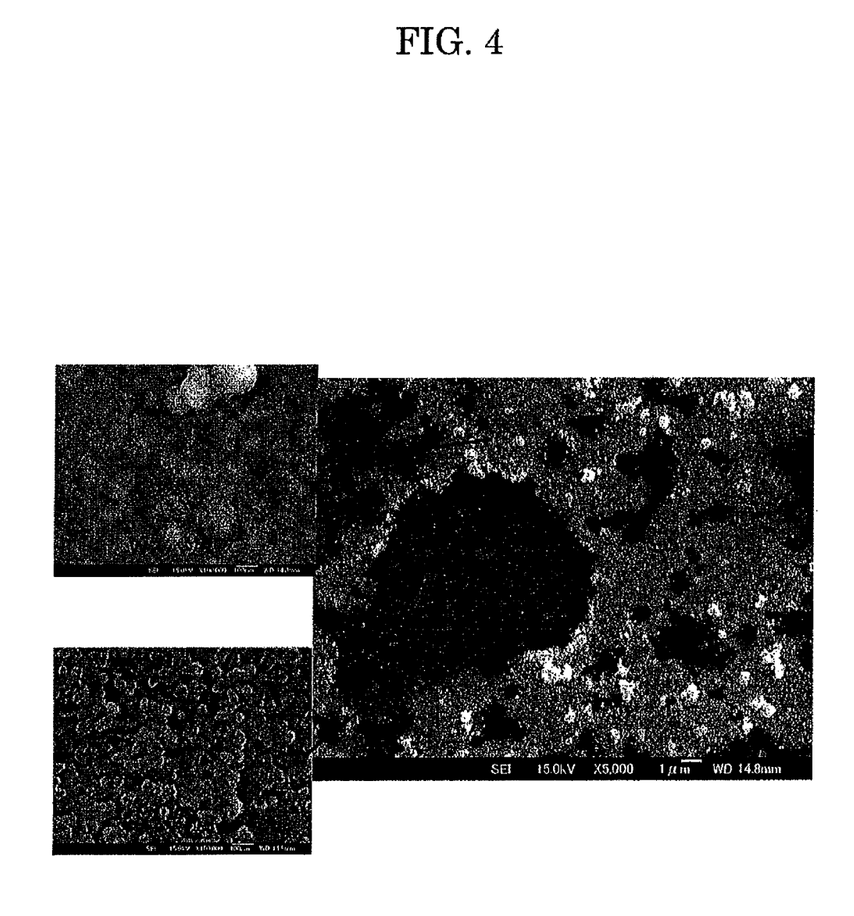
FIG. 4 is an EF-SEM image of the tungsten layer, after removing the zinc oxide micro-spheres, of the dye-sensitized solar cell of Example 22.

Table 4: Electrolysis solution: Acetonitrile solution, Iodine 40 mM, LiI 500 mM, t-Butylprtidine 580 mM EF-SEM images of the layers, such as the layer of titania paste, formed on the transparent conductive film substrate one by one in Example 22 are shown in FIG. 2 to FIG. 4.

Figure 2:
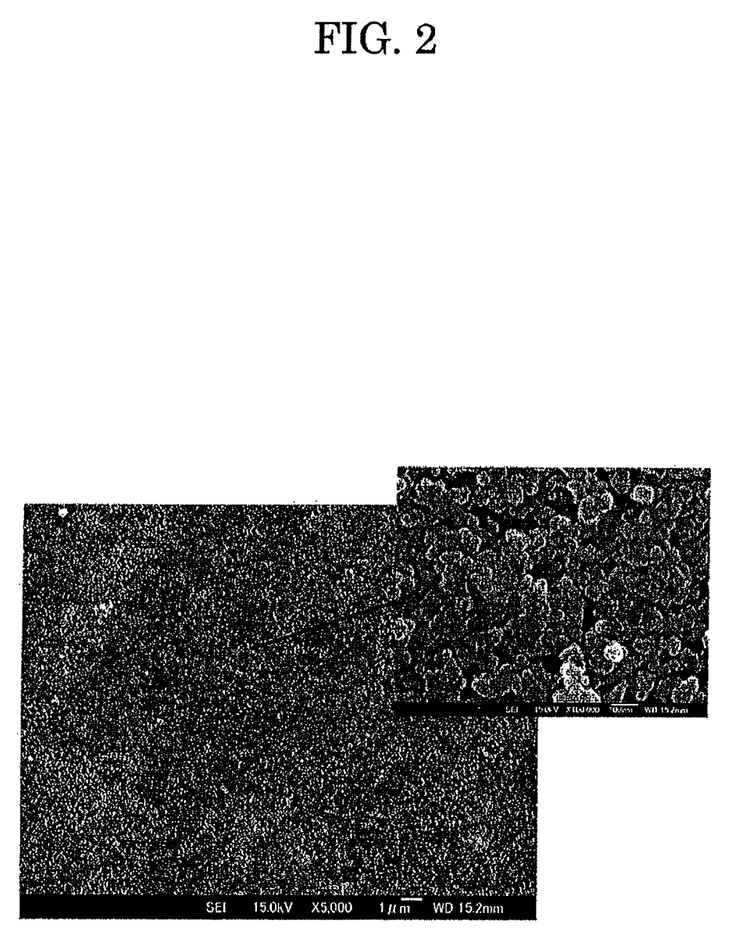
FIG. 2 is an EF-SEM image of the titania layer of the dye-sensitized solar cell of Example 22.

FIG. 2 is an EF-SEM image of the titania layer, which shows that in the titania layer titania particles aggregated, bringing the titania layer in a porous state. FIG. 3 is an EF-SEM image of the tungsten layer formed by dispersing zinc oxide, micro-spheres on the titania layer and sputtering tungsten, which shows that part of tungsten aggregated and was in a particle-like state. FIG. 4 is an EF-SEM image of the tungsten layer from which zinc oxide micro-spheres had been removed, which shows that pores a few μm to 10 μm or more in size were randomly formed in the tungsten layer and the titania layer, under the tungsten layer, was exposed.

Example 23

Titania paste (20 nm in diameter) was applied to the transparent conductive film provided on a substrate and dried at 450° C. to produce a titania layer 30 μm thick. Further, a paste prepared by mixing titania (25 μm in diameter) and zinc oxide (20 μm in diameter) in a mixing ratio of 1:1 was applied to the surface of the titania film by electrospraying to form a film 50 nm in diameter. The obtained film was burned at 500° C. for 5 minutes and then a tungsten film 150 nm thick was formed by sputtering. After that, the film was rinsed with a dilute acetic acid solution to dissolve zinc oxide, whereby a thick porous electrode (tungsten film) was prepared. Then the electrode was made to adsorb Blackdye, an electrolysis solution (a solution of 30 mM iodine, 500 mM LiI and 580 mM t-butylpyridine in acetonitrile) was injected, and a transparent conductive film with platinum was formed as a counter electrode.

The evaluation of the solar cell performance showed that the conversion efficiency was 10.7%.

The invention claimed is:

1. A process for producing a dye-sensitized solar cell that comprises a transparent substrate, a transparent conductive film formed on the surface of the transparent substrate, a conductive substrate provided opposite to the transparent conductive film, and a dye-adsorbed porous semiconductor layer and an electrolyte between the transparent conductive film and the conductive substrate, comprising the following steps, carried out in the recited order:

a first step in which the porous semiconductor layer is formed on the transparent conductive film, on a surface opposite that contacting the transparent substance;

a second step in which a fine-particle layer made up of fine particles removable by heating or solvent-cleaning is formed on the porous semiconductor layer, on a surface opposite that contacting the transparent conductive film;

a third step in which a conductive metal film is formed on the fine-particle layer on a surface opposite that contacting the porous semiconductor layer; and a fourth step in which the fine-particle layer is made to disappear by heating or solvent-cleaning.

2. The process for producing a dye-sensitized solar cell according to claim 1, further comprising a fifth step in which a porous semiconductor layer, different from the porous semiconductor layer formed in the first step, is formed on the surface of the conductive metal film.

3. The process for producing a dye-sensitized solar cell according to claim 1, characterized in that the particle size of fine particles removable by heating or solvent-cleaning and used in the second step is 50 to 400 nm and the thickness of the conductive metal film formed in the third step is 50 to 400 nm.

* * * * *

UNITED STATES PATENT AND TRADEMARK OFFICE
CERTIFICATE OF CORRECTION

| | |
|---|---|
| PATENT NO. | : 8,748,735 B2 |
| APPLICATION NO. | : 13/303326 |
| DATED | : June 10, 2014 |
| INVENTOR(S) | : Shuzi Hayase et al. |

It is certified that error appears in the above-identified patent and that said Letters Patent is hereby corrected as shown below:

On the Title Page insert:

-- (30) Foreign Application Priority Data
    June 29, 2006    (JP) ........................................ 2006-178852 --.

Signed and Sealed this
Fifth Day of August, 2014

Michelle K. Lee
*Deputy Director of the United States Patent and Trademark Office*